US012647003B2

(12) United States Patent
Sato

(10) Patent No.: US 12,647,003 B2
(45) Date of Patent: Jun. 2, 2026

(54) MOTOR DEVICE AND MOTOR CONTROL DEVICE

(71) Applicant: JTEKT CORPORATION, Kariya (JP)

(72) Inventor: Yuto Sato, Nagoya (JP)

(73) Assignee: JTEKT CORPORATION, Kariya (JP)

( * ) Notice: Subject to any disclaimer, the term of this patent is extended or adjusted under 35 U.S.C. 154(b) by 204 days.

(21) Appl. No.: 18/704,278

(22) PCT Filed: Nov. 24, 2021

(86) PCT No.: PCT/JP2021/043039
§ 371 (c)(1),
(2) Date: Apr. 24, 2024

(87) PCT Pub. No.: WO2023/095218
PCT Pub. Date: Jun. 1, 2023

(65) Prior Publication Data
US 2024/0421670 A1 Dec. 19, 2024

(51) Int. Cl.
H02K 11/33 (2016.01)
H02K 5/22 (2006.01)
H02K 11/40 (2016.01)

(52) U.S. Cl.
CPC ............. H02K 11/33 (2016.01); H02K 5/225 (2013.01); H02K 11/40 (2016.01); H02K 2211/03 (2013.01)

(58) Field of Classification Search
CPC ........ H02K 11/33; H02K 5/225; H02K 11/40; H02K 2211/03; H02K 5/08; H02K 9/227
(Continued)

(56) References Cited

U.S. PATENT DOCUMENTS

| | | | |
|---|---|---|---|
| 10,696,320 B2 | 6/2020 | Asao et al. | |
| 2015/0061558 A1* | 3/2015 | Yano | F01C 21/10 |
| | | | 318/400.26 |

(Continued)

FOREIGN PATENT DOCUMENTS

| | | |
|---|---|---|
| CN | 212376927 U | 1/2021 |
| CN | 213043507 U | 4/2021 |

(Continued)

OTHER PUBLICATIONS

Dec. 18, 2024 extended Search Report issued in European Patent Application No. 21965591.7.

(Continued)

*Primary Examiner* — Ahmed Elnakib
(74) *Attorney, Agent, or Firm* — Oliff PLC

(57) ABSTRACT

A motor device includes a motor and a motor control device. The motor control device includes a board attached to an end portion of the motor, and a cover that covers the board. The motor has a motor body and a connector assembly. The board has an extending portion that overlays the connector assembly. The extending portion has terminal connecting portions to which terminals, held by the connector assembly, are connected. The cover has a first projecting portion that projects from an inner face of the end wall thereof toward the board. The first projecting portion comes into contact with a region of the board adjacent to the terminal connecting portions before the terminal comes into contact with the end wall of the cover, when the end wall of the cover is deflected in a direction closer the board.

5 Claims, 8 Drawing Sheets

(58) Field of Classification Search
USPC ......................................................... 310/68 R
See application file for complete search history.

(56)                    References Cited

U.S. PATENT DOCUMENTS

| | | | |
|---|---|---|---|
| 2015/0214812 A1* | 7/2015 | Tooyama ............... | H02K 5/225 |
| | | | 310/71 |
| 2017/0093255 A1* | 3/2017 | Harada .............. | H02K 11/0094 |
| 2020/0140004 A1 | 5/2020 | Matsuda et al. | |
| 2020/0332800 A1 | 10/2020 | Miyasaka | |
| 2022/0224208 A1* | 7/2022 | Tomita ................... | H02K 5/225 |
| 2024/0421670 A1* | 12/2024 | Sato ....................... | H02K 11/40 |

FOREIGN PATENT DOCUMENTS

| | | |
|---|---|---|
| EP | 3 587 821 A1 | 1/2020 |
| JP | 2005-304203 A | 10/2005 |
| JP | 2010-141988 A | 6/2010 |
| JP | 2015-050873 A | 3/2015 |
| JP | 2019-075872 A | 5/2019 |
| JP | 2020-072621 A | 5/2020 |

OTHER PUBLICATIONS

Feb. 1, 2022 International Search Report issued in International Patent Application No. PCT/JP2021/043039.

* cited by examiner

Fig.2

MOTOR DEVICE AND MOTOR CONTROL DEVICE

TECHNICAL FIELD

The present disclosure relates to a motor device and a motor control device.

BACKGROUND ART

A motor device according to Patent Document 1 has a motor and an ECU (electronic control unit). The ECU is provided at an end portion of the motor. The ECU has a board, a cover, and a connector. The board is fixed to the end portion of the motor. The cover is a cylindrical body that opens toward the motor. The cover is attached to the end portion of the motor so as to cover the board. The connector has a base portion and a connector portion. The base portion is fixed to the end portion of the motor in a state of being covered by the cover. The base portion is maintained in a state of being in contact with an inner face of an end wall of the cover, in an axial direction of the motor. The connector portion passes through the end wall of the cover in the axial direction of the motor, and projects outside. The connector portion has a power source terminal. The power source terminal is connected to the board.

A motor device according to Patent Document 2 has a motor and a control device. The control device is attached to a side portion of the motor. The control device has a housing, a metal board, a high-current board, a control board, and a cover. The housing is box-shaped, and opens on a side that is opposite to the motor. The metal board is a power board and has large-current components such as semiconductor switching devices and capacitors. The high-current board has a plurality of conductive plates making up pattern wiring, and an insulating resin member into which these conductive plates are inserted. The control board has a microcomputer. The metal board, the high-current board, and the control board are housed in the housing in this order. The cover is attached to the housing so as to close the opening of the housing.

The motor devices according to Patent Documents 1 and 2 are used, for example, as a drive source for an electric power steering system.

RELATED ART DOCUMENTS

Patent Documents

Patent Document 1: Japanese Unexamined Patent Application Publication No. 2020-72621 (JP 2020-72621 A)
Patent Document 2: Japanese Unexamined Patent Application Publication No. 2005-304203 (JP 2005-304203 A)

SUMMARY OF THE INVENTION

Problem to be Solved by the Invention

External force may be applied to the cover of the motor device. The external force is, for example, a force in a direction intersecting the end wall of the cover. As an example, when the motor device is for a vehicle, there is concern that a portion of the vehicle may interfere with the cover of the motor device in the event of a collision of the vehicle. There is concern that the cover will be crushed by application of external force to the cover, and that the deformed portion of the cover will interfere with the board, causing electrical damage to the board of the motor device and other electronic components in the vehicle.

Means for Solving the Problem

A motor device according to one aspect of the present disclosure includes a motor, and a motor control device provided at an end portion of the motor. The motor control device has a board attached to the end portion of the motor to control the motor, and a cover that has flexibility and that is attached to the end portion of the motor so as to cover the board. The motor has a motor body and a connector assembly that is disposed on a side of the motor body as viewed from an axial direction of the motor body. The board has an extending portion that extends to the side of the motor body so as to overlay the connector assembly, as viewed in the axial direction of the motor body. The extending portion has a terminal connecting portion located between an end wall of the cover and the connector assembly. A terminal held by the connector assembly is connected to the terminal connecting portion in a state of passing through the extending portion from the connector assembly toward the cover. The cover has a first projecting portion having insulating properties that projects from an inner face of the end wall thereof toward the board. The first protruding portion is configured such that, when the end wall of the cover is subjected to an external force and is deflected in a direction closer to the board, the first projecting portion comes into contact with a region of the board adjacent to the terminal connecting portion before the terminal comes into contact with the end wall of the cover. A motor control device according to an aspect of the present disclosure is provided to the motor device.

BRIEF DESCRIPTION OF THE DRAWINGS

FIG. 2 is a perspective view of the motor device in FIG. 1 disassembled.

MODES FOR CARRYING OUT THE INVENTION

First Embodiment

A motor device 11 according to a first embodiment will be described.

<Overall Configuration>

Figure 1:
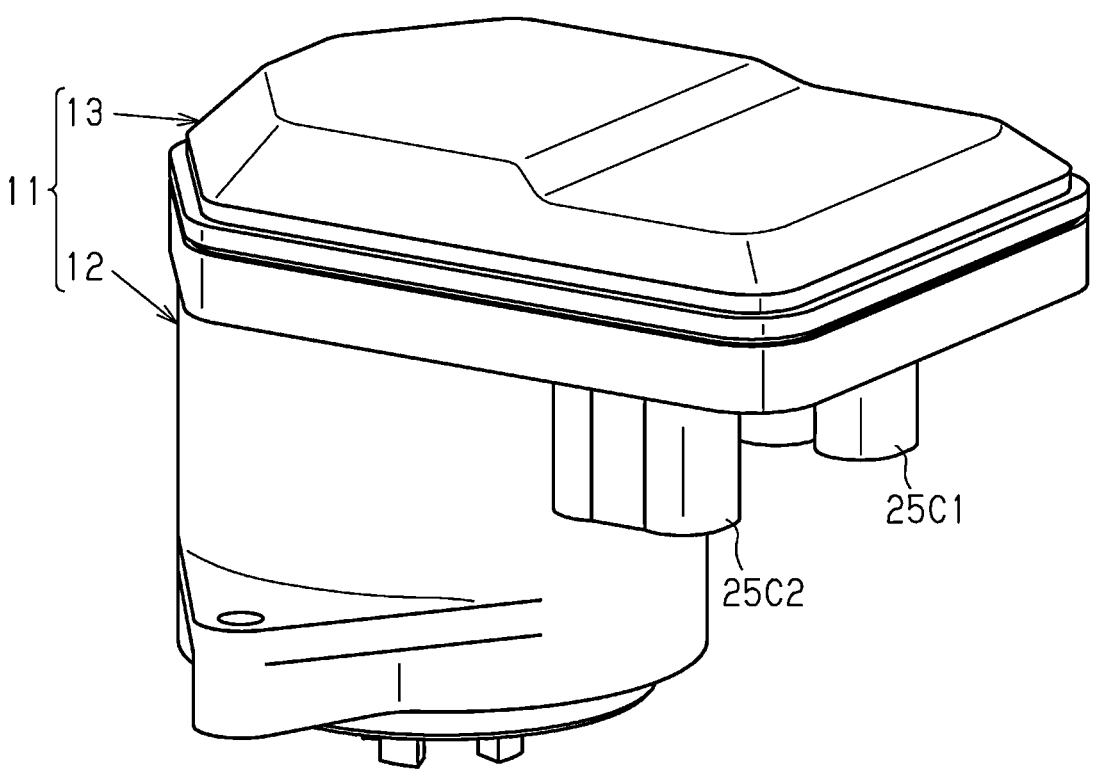
FIG. 1 is a perspective view illustrating an external appearance of a motor device according to an embodiment.

As illustrated in FIG. 1, the motor device 11 has a motor 12 and a motor control device 13. The motor 12 is, for example, a three-phase brushless motor. The three phases are U phase, V phase and W phase. The motor 12 has two systems of winding groups. The motor control device 13 is provided at an end portion of the motor 12. The motor control device 13 independently controls power feeding to the two systems of winding groups.

<Motor>

Figure 2:
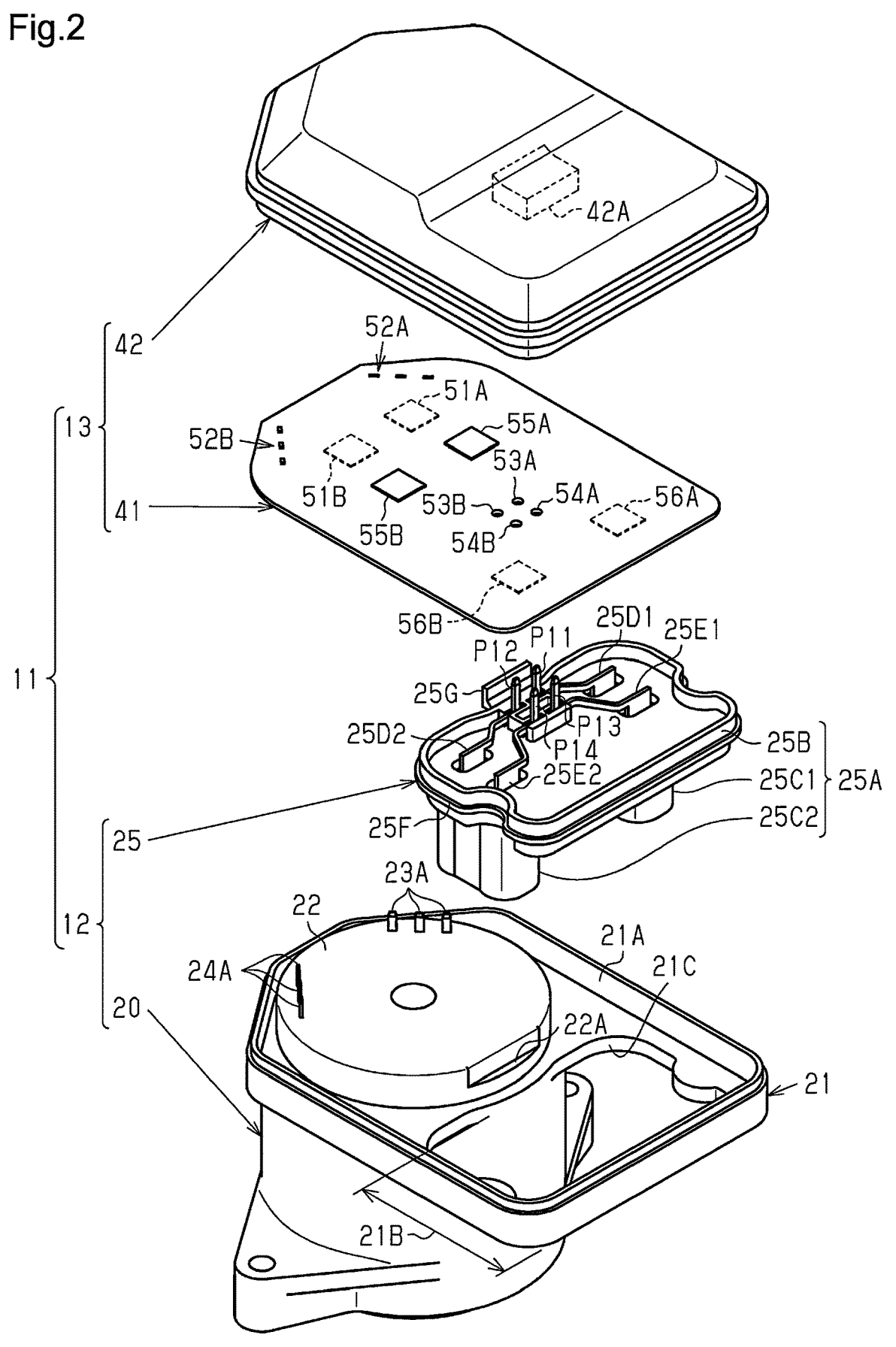

As illustrated in FIG. 2, the motor 12 has a motor body 20 and a connector assembly 25.

The motor body 20 has a case that is cylindrical. The case is made of metal. A stator, a busbar module, and a rotor are housed inside the case. The stator has a core that is cylindrical and that is fit to an inner peripheral face of the case, and a plurality of windings wound around the core over an insulator. The busbar module has a holder that is cylindrical, and a plurality of busbars that is held by the holder. One end of a winding is connected to each busbar. The rotor is inserted into the stator and the busbar module in a non-contact state. The rotor has an output shaft, and a magnet that is cylindrical and that is fixed to an outer peripheral face of the output shaft. The output shaft is rotatably borne with respect to the inner peripheral face of the case via a bearing. The motor body 20 has a first end portion on a side from which the output shaft projects, and a second end portion on an opposite side to the first end portion.

A board housing portion 21 is provided at an end portion of the motor body 20. In the present embodiment, the end portion of the motor body 20 to which the board housing portion 21 is provided is the second end portion. The board housing portion 21 is made of metal, and is provided integrally with the case of the motor body 20. The board housing portion 21 is a rectangular box-shaped member having an opening portion 21A. The opening portion 21A opens in a direction opposite to the motor body 20. The board housing portion 21 has an extending portion 21B. The extending portion 21B is a portion of the board housing portion 21 that extends to a side of the motor body 20. The side is a direction orthogonal to an axial direction of the motor body 20 as viewed from the axial direction of the motor body 20. The board housing portion 21 has a fitting hole 21C. The fitting hole 21C is provided in an end wall of the extending portion 21B. The fitting hole 21C passes through the end wall of the extending portion 21B in the axial direction of the motor 12.

A heat sink 22 is provided at the second end portion of the motor body 20. The heat sink 22 is made of metal. The metal is a metal such as aluminum or the like, having excellent electroconductivity and thermal conductivity. The heat sink 22 is cylindrical. The heat sink 22 is located coaxially with respect to an axial line of the motor 12. The heat sink 22 passes through an end wall of the board housing portion 21 in the axial direction of the motor 12. A portion of the heat sink 22 is exposed to the inside of the board housing portion 21.

Three first motor terminals 23A are provided on the heat sink 22. These first motor terminals 23A respectively correspond to the three phases of the windings making up a first winding group. Each of the first motor terminals 23A is a portion of the busbars. Inside the motor body 20, one end of the first winding of each phase is connected to the busbar of the corresponding phase. The first motor terminals 23A pass through the heat sink 22 in the axial direction of the motor body 20, via an insulating member. The three first motor terminals 23A are tangentially aligned with respect to a contour of the motor body 20 as viewed from the axial direction of the motor body 20.

Three second motor terminals 24A are provided on the heat sink 22. These second motor terminals 24A respectively correspond to the three phases of the windings making up a second winding group. Each of the second motor terminals 24A is a portion of the busbars. Inside the motor body 20, one end of the second winding of each phase is connected to the busbar of the corresponding phase. The second motor terminals 24A pass through the heat sink 22 in the axial direction of the motor body 20, via an insulating member. The three second motor terminals 24A are tangentially aligned with respect to the contour of the motor body 20 as viewed from the axial direction of the motor body 20.

The connector assembly 25 has a body 25A made of synthetic resin. The body 25A has a base 25B, a first connector fitting portion 25C1, and a second connector fitting portion 25C2. The base 25B is a rectangular box-shaped body that opens in the same direction as the opening portion 21A of the board housing portion 21. The base 25B has a first end face facing in the same direction as the opening portion 21A of the board housing portion 21, and a second end face on a side opposite to the first end face. The first connector fitting portion 25C1 is provided on the second end face of the base 25B. The first connector fitting portion 25C1 is a cylindrical body extending from the second end face of the base 25B, and is open in a direction toward which the second end face faces. A plug connector is fit into the first connector fitting portion 25C1. The plug connector is provided at a first end portion of wiring. A second end portion of the wiring is connected to a direct current power source such as a battery or the like that is provided outside of the motor device 11. The second connector fitting portion 25C2 has the same configuration as the first connector fitting portion 25C1. The first connector fitting portion 25C1 and the second connector fitting portion 25C2 are arranged across an interval in a long side direction of the base 25B.

The connector assembly 25 has a first power source terminal 25D1 and a first ground terminal 25E1. The first power source terminal 25D1 is provided following a route extending from inside of the first connector fitting portion 25C1 and passing through an end wall of the base 25B. A first end portion of the first power source terminal 25D1 is located inside of the first connector fitting portion 25C1. A second end portion of the first power source terminal 25D1 stands upright with respect to the end wall of the base 25B. The first ground terminal 25E1 is basically provided in the same way as the first power source terminal 25D1. The first power source terminal 25D1 and the first ground terminal 25E1 are arranged in a short side direction of the base 25B.

The connector assembly 25 has a second power source terminal 25D2 and a second ground terminal 25E2. The second power source terminal 25D2 is provided following a route extending from inside of the second connector fitting portion 25C2 and passing through the end wall of the base 25B. A first end portion of the second power source terminal 25D2 is located inside of the second connector fitting portion 25C2. A second end portion of the second power source terminal 25D2 stands upright with respect to the end wall of the base 25B. The second ground terminal 25E2 is basically provided in the same way as the second power source terminal 25D2. The second power source terminal 25D2 and the second ground terminal 25E2 are arranged in the short side direction of the base 25B.

The connector assembly 25 is attached to the board housing portion 21 of the motor 12. An outer peripheral face of the base 25B is fit into an inner peripheral face of the fitting hole 21C of the board housing portion 21. The base 25B is inserted into the fitting hole 21C in an orientation with the first connector fitting portion 25C1 and the second connector fitting portion 25C2 facing the opening portion 21A of the board housing portion 21. A flange portion 25F is provided over the entire perimeter of the outer peripheral face of the base 25B. The flange portion 25F is maintained in a state of being in contact with a peripheral edge portion of the fitting hole 21C in the axial direction of the motor body 20. The first connector fitting portion 25C1 and the second connector fitting portion 25C2 project from the end wall of the board housing portion 21 in a direction opposite to an opening direction of the base 25B.

Figure 3:
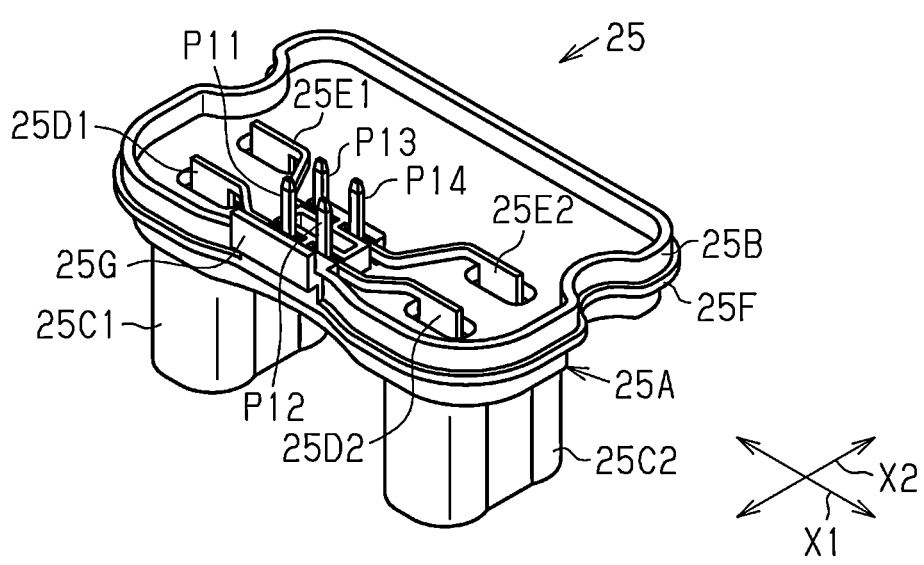
FIG. 3 is a perspective view of a connector assembly in FIG. 2.

As illustrated in FIG. 2 and FIG. 3, the upright second end portion of the first power source terminal 25D1 is a first connecting portion P11 that is electrically connected to the motor control device 13. The upright second end portion of the second power source terminal 25D2 is a second connecting portion P12 that is electrically connected to the motor control device 13. An upright second end portion of the first ground terminal 25E1 is a third connecting portion P13 that is electrically connected to the motor control device 13. An upright second end portion of the second ground terminal 25E2 is a fourth connecting portion P14 that is electrically connected to the motor control device 13.

The first to fourth connecting portions P11 to P14 are provided as close to the motor body 20 as possible within an allowable range, as viewed from the axial direction of the motor body 20. As viewed from the axial direction of the motor body 20, the first to fourth connecting portions P11 to P14 are closer to a long side wall that is close to the motor body 20, out of two long side walls of the base 25B, than other portions of the terminals (25D1, 25D2, 25E1, 25E2). The first to fourth connecting portions P11 to P14 are located corresponding to the middle of the long side wall close to the motor body 20 as viewed from the axial direction of the motor body 20.

The first connecting portion P11 and the third connecting portion P13 are aligned in a short side direction X2 of the base 25B as viewed from the axial direction of the motor body 20. The first connecting portion P11 is closer to the motor body 20 than the third connecting portion P13 as viewed from the axial direction of the motor body 20. The second connecting portion P12 and the fourth connecting portion P14 are aligned in the short side direction X2 of the base 25 as viewed from the axial direction of the motor body 20. The second connecting portion P12 is closer to the motor body 20 than the fourth connecting portion P14 as viewed from the axial direction of the motor body 20. The first connecting portion P11 and the second connecting portion P12 are aligned in a long side direction X1 of the base 25 as viewed from the axial direction of the motor body 20. The third connecting portion P13 and the fourth connecting portion P14 are aligned in the long side direction X1 of the base 25 as viewed from the axial direction of the motor body 20.

The connector assembly 25 has a second projecting portion 25G. The second projecting portion 25G is a flat wall provided on the long side wall closer to the motor body 20, out of the two long side walls that the base 25B has. The second projecting portion 25G is located further outside in a short side direction with respect to an outer face of the long side wall. That is to say, the second projecting portion 25G extends outward from the outer peripheral face of the base 25B. The second projecting portion 25G is located at the middle of the long side wall and extends along the long side wall. A base end portion of the second projecting portion 25G is linked to the long side wall. A distal end portion of the second projecting portion 25G projects from an opened end face of the base 25B, in a direction opposite to the projecting direction of the first connector fitting portion 25C1 and the second connector fitting portion 25C2.

<Motor Control Device>

As illustrated in FIG. 2, the motor control device 13 has a single board 41 and a cover 42.

The board 41 has a configuration for supplying electric power to the motor 12. A contour shape of an outer perimeter of the board 41 corresponds to a contour shape of an inner perimeter of the board housing portion 21 as viewed from the axial direction of the motor 12. The board 41 is housed inside pf the board housing portion 21. The board 41 is stacked on the heat sink 22 and the connector assembly 25 housed inside the board housing portion 21. The board 41 is fixed to a support portion provided to the connector assembly 25, and a support portion provided inside the board housing portion 21. The board 41 is maintained in an orientation orthogonal to the axial direction of the motor body 20.

The board 41 has a configuration for supplying electric power to the winding group of a first system of the motor 12. The board 41 has, as configurations of the first system, a first inverter circuit 51A, a first motor terminal connecting portion 52A, a first power source terminal connecting portion 53A, a first ground terminal connecting portion 54A, a first filter 55A, and a first microcomputer 56A. The board 41 has a rear face that faces the end wall of the board housing portion 21 in the axial direction of the motor body 20, and a front face on an opposite side from the rear face thereof.

The first inverter circuit 51A generates electric power to be supplied to the winding group of the first system of the motor 12. The first inverter circuit 51A converts direct current electric power supplied from a direct current power source into three-phase alternating current electric power. The first inverter circuit 51A is provided on the rear face of the board 41. The first inverter circuit 51A has a plurality of FETs (Field Effect Transistor). An FET is a heat-generating element. Each FET is maintained in a state of being in contact with the heat sink 22 via thermal paste.

The first motor terminal connecting portion 52A is provided at a position corresponding to the three first motor terminals 23A. The first motor terminal connecting portion 52A is a group of three-phase connecting parts to which the three first motor terminals 23A are respectively connected. The three-phase connecting parts making up the group are provided at positions corresponding to the three first motor terminals 23A as viewed from the axial direction of the motor body 20. The connecting parts include, for example, first through holes that pass through the board 41 in a thickness direction thereof.

The thickness direction of the board 41 is also the axial direction of the motor body 20. Each first motor terminal 23A is inserted into the corresponding first through hole in the axial direction of the motor body 20, and thereby is connected to the corresponding connecting part.

The first power source terminal connecting portion 53A is a portion to which the first power source terminal 25D1 is connected. The first power source terminal connecting portion 53A is provided at a position corresponding to the upright second end portion of the first power source terminal 25D1 as viewed from the axial direction of the motor body 20. The second end portion of the first power source terminal 25D1 is connected to the first power source terminal connecting portion 53A in the axial direction of the motor body 20. The first power source terminal connecting portion 53A includes, for example, a first hole that passes through the board 41 in the thickness direction thereof. The first power source terminal 25D1 is connected to the first power source terminal connecting portion 53A by being inserted into the first hole of the board 41 in the axial direction of the motor body 20.

The first ground terminal connecting portion 54A is a portion to which the first ground terminal 25E1 is connected. The first ground terminal connecting portion 54A is provided at a position corresponding to the upright second end portion of the first ground terminal 25E1 as viewed from the axial direction of the motor body 20. The second end portion of the first ground terminal 25E1 is connected to the first ground terminal connecting portion 54A in the axial direction of the motor body 20. The first ground terminal connecting portion 54A includes, for example, a second hole that passes through the board 41 in the thickness direction thereof. The first ground terminal 25E1 is connected to the first ground terminal connecting portion 54A by being inserted into the second hole of the board 41 in the axial direction of the motor body 20.

The first filter 55A is, for example, an LC filter made up of an inductor and a capacitor. The first filter 55A is provided on the front face of the board 41. An inductor is a heat-generating element made up of a coil.

The first microcomputer 56A is a chip-type integrated circuit. The first microcomputer 56A controls power feed to the winding group of the first system of the motor 12, via the first inverter circuit 51A. The first microcomputer 56A is provided on the rear face of the board 41.

The board 41 has a configuration for supplying electric power to the winding group of a second system of the motor 12. The board 41 has, as configurations of the second system, a second inverter circuit 51B, a second motor terminal connecting portion 52B, a second power source terminal connecting portion 53B, a second ground terminal connecting portion 54B, a second filter 55B, and a second microcomputer 56B.

The second inverter circuit 51B generates electric power to be supplied to the winding group of the second system of the motor 12. The second inverter circuit 51B converts direct current electric power supplied from a direct current power source into three-phase alternating current electric power. The second inverter circuit 51B is provided on the rear face of the board 41. The second inverter circuit 51B has a plurality of FETs. Each FET is maintained in a state of being in contact with the heat sink 22 via thermal paste.

The second motor terminal connecting portion 52B is provided at a position corresponding to the three second motor terminals 24A. The second motor terminal connecting portion 52B is a group of three-phase connecting parts to which the three second motor terminals 24A are respectively connected. The three-phase connecting parts making up the group are provided at positions corresponding to the three second motor terminals 24A as viewed from the axial direction of the motor body 20. The connecting parts include, for example, second through holes that pass through the board 41 in the thickness direction thereof. Each second motor terminal 24A is inserted into the corresponding second through hole in the axial direction of the motor body 20, and thereby is connected to the corresponding connecting part.

The second power source terminal connecting portion 53B is a portion to which the second power source terminal 25D2 is connected. The second power source terminal connecting portion 53B is provided at a position corresponding to the upright second end portion of the second power source terminal 25D2 as viewed from the axial direction of the motor body 20. The second end portion of the second power source terminal 25D2 is connected to the second power source terminal connecting portion 53B in the axial direction of the motor body 20. The second power source terminal connecting portion 53B includes, for example, a third hole that passes through the board 41 in the thickness direction thereof. The second power source terminal 25D2 is connected to the second power source terminal connecting portion 53B by being inserted into the third hole of the board 41 in the axial direction of the motor body 20.

The second ground terminal connecting portion 54B is a portion to which the second ground terminal 25E2 is connected. The second ground terminal connecting portion 54B is provided at a position corresponding to the upright second end portion of the second ground terminal 25E2 as viewed from the axial direction of the motor body 20. The second end portion of the second ground terminal 25E2 is connected to the second ground terminal connecting portion 54B in the axial direction of the motor body 20. The second ground terminal connecting portion 54B includes, for example, a fourth hole that passes through the board 41 in the thickness direction thereof. The second ground terminal 25E2 is connected to the second ground terminal connecting portion 54B by being inserted into the fourth hole of the board 41 in the axial direction of the motor body 20.

The second filter 55B is, for example, an LC filter made up of an inductor and a capacitor. The second filter 55B is provided on the front face of the board 41.

The second microcomputer 56B is a chip-type integrated circuit. The second microcomputer 56B controls power feed to the winding group of the second system of the motor 12, via the second inverter circuit 51B. The second microcomputer 56B is provided on the rear face of the board 41.

The cover 42 is made of synthetic resin. The cover 42 is a rectangular box-shaped body that opens toward the motor body 20. The cover 42 is attached to the board housing portion 21 so as to cover the opening portion 21A of the board housing portion 21, in a state in which the board 41 is supported by the support portion of the connector assembly 25 and the support portion of the board housing portion 21.

Figure 4:
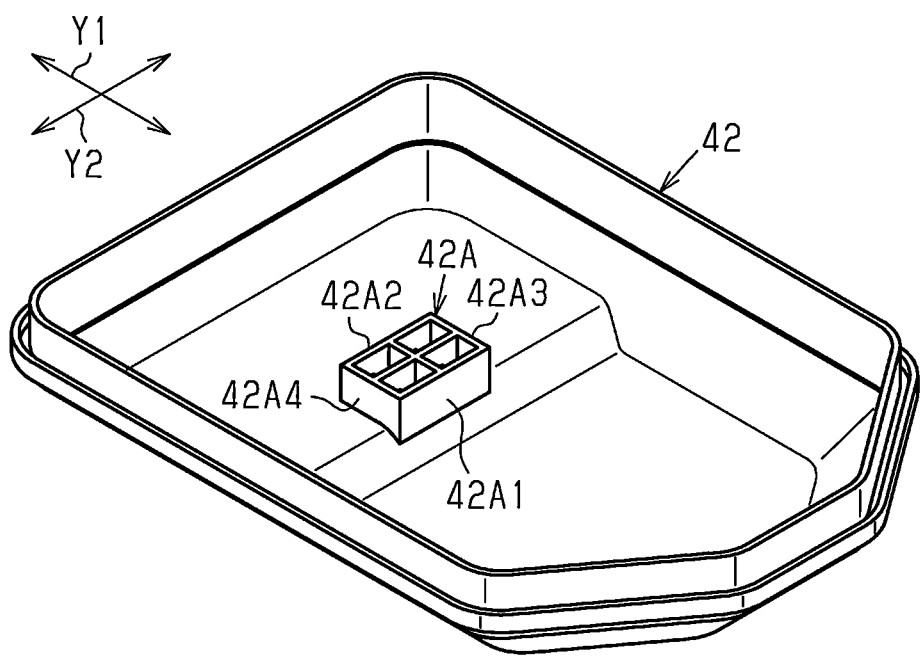
FIG. 4 is a perspective view of a cover in FIG. 2.

As illustrated in FIG. 2 and FIG. 4, the cover 42 has a first projecting portion 42A. The first projecting portion 42A is provided on an inner face of an end wall of the cover 42. The first projecting portion 42A has a peripheral wall having a rectangular cross-sectional shape, and opens in a direction that is opposite to the end wall of the cover 42. The height of projection of the first projecting portion 42A, with the inner face of the end wall of the cover 42 as a reference, is higher than a projecting length of the terminals (25D1, 25D2, 25E1, 25E2) with the front face of the board 41 as a reference. The first projecting portion 42A, as viewed from the axial direction of the motor body 20, is provided so as to overlay the region of the board 41 where the first power source terminal connecting portion 53A, the first ground terminal connecting portion 54A, the second power source terminal connecting portion 53B, and the second ground terminal connecting portion 54B are provided.

As illustrated in FIG. 4, the first projecting portion 42A has a first long side wall 42A1, a second long side wall 42A2, a first short side wall 42A3, and a second short side wall 42A4. The first long side wall 42A1 and the second long side wall 42A2 face each other in a long side direction Y1 of the cover 42 as viewed from the axial direction of the motor body 20. The first short side wall 42A3 and the second short side wall 42A4 face each other in a short side direction Y2 of the cover 42 as viewed from the axial direction of the motor body 20.

Figure 5:
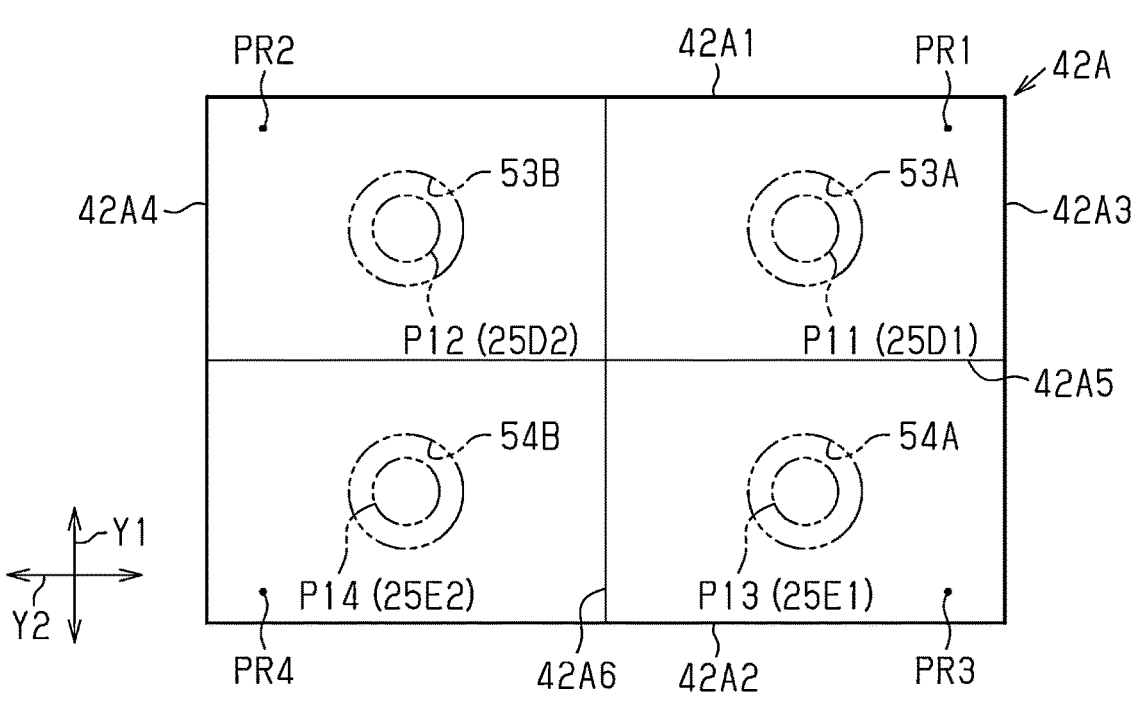
FIG. 5 is a schematic diagram of a first regulating unit of the cover in FIG. 2, as viewed from an axial direction of a motor body.

As illustrated in FIG. 5, as viewed from the axial direction of the motor body 20, inside of the first projecting portion 42A is divided into four chambers by a first partition wall 42A5 and a second partition wall 42A6. The first partition wall 42A5 and the second partition wall 42A6 are orthogonal to each other. The first partition wall 42A5 is parallel to the first long side wall 42A1 and the second long side wall 42A2. The second partition wall 42A6 is parallel to the first short side wall 42A3 and the second short side wall 42A4.

The first projecting portion 42A has a first chamber PR1, a second chamber PR2, a third chamber PR3, and a fourth chamber PR4. The first chamber PR1 corresponds to the first power source terminal connecting portion 53A, and the first connecting portion P11 which is an upright end portion of the first power source terminal 25D1, as viewed from the axial direction of the motor body 20. The second chamber PR2 corresponds to the first ground terminal connecting portion 54A, and the third connecting portion P13 which is an upright end portion of the first ground terminal 25E1, as viewed from the axial direction of the motor body 20. The third chamber PR3 corresponds to the second power source terminal connecting portion 53B, and the second connecting portion P12 which is an upright end portion of the second power source terminal 25D2, as viewed from the axial direction of the motor body 20. The fourth chamber PR4 corresponds to the second ground terminal connecting portion 54B, and the fourth connecting portion P14 which is an upright end portion of the second ground terminal 25E2, as viewed from the axial direction of the motor body 20.

<Assembled State of Motor Device>

Figure 6:
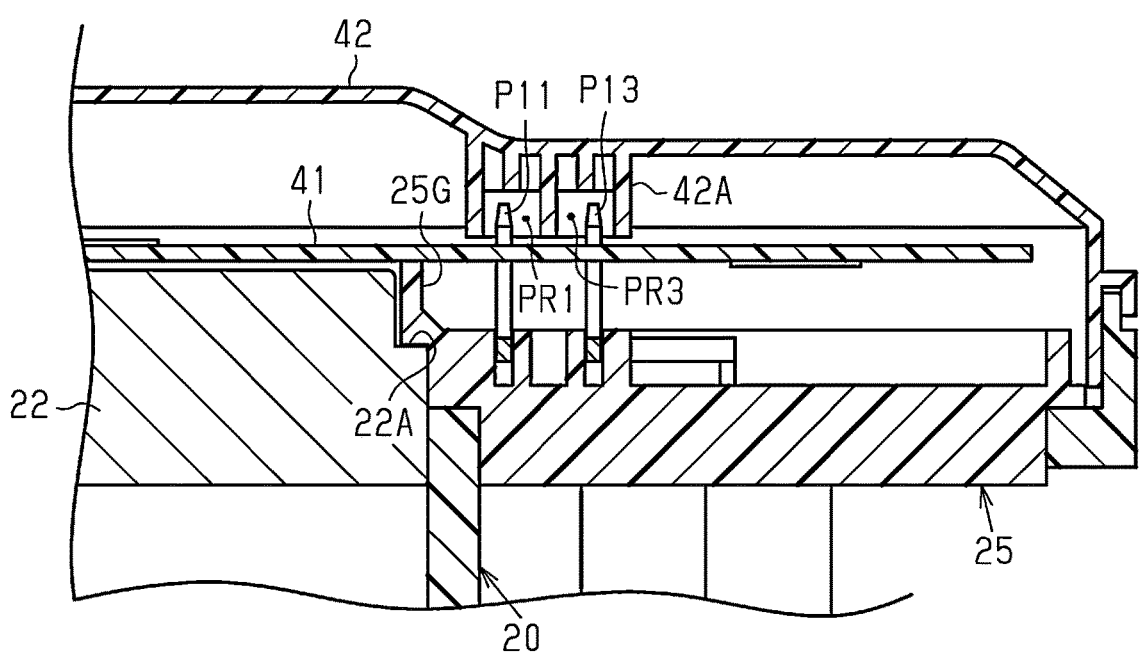
FIG. 6 is a cross-sectional view illustrating principal portions of the motor device in FIG. 2.

As illustrated in FIG. 6, in a state in which the motor device 11 is assembled, the base end portion of the second projecting portion 25G of the connector assembly 25 is maintained in a state of being in contact with a stepped face 22A provided at a peripheral edge portion of the heat sink 22, in the axial direction of the motor body 20. The stepped face 22A may be a plane that is orthogonal to the axial direction of the motor body 20. In a state in which the motor device 11 is assembled, the distal end portion of the second projecting portion 25G in the connector assembly 25 is held at a position closer to the board 41 than an end face of the heat sink 22. The second projecting portion 25G supports the board 41 in cooperation with other support portions. The distal end portion of the second projecting portion 25G is maintained in a state of being in contact with the rear face of the board 41. The rear face of the board 41 is maintained in a state isolated from the end face of the heat sink 22. A clearance is formed between the rear face of the board 41 and the end face of the heat sink 22.

In a state in which the motor device 11 is assembled, a distal end portion of the first projecting portion 42A of the cover 42 is maintained in a state isolated from the front face of the board 41. A clearance is formed between the distal end face of the first projecting portion 42A and the front face of the board 41.

In the assembled state of the motor device 11, the first connecting portion P11, which is the end portion of the first power source terminal 25D1, and the third connecting portion P13, which is the end portion of the first ground terminal 25E1, pass through the board 41 in the axial direction of the motor body 20. A distal end of the first connecting portion P11 is inserted into the first chamber PR1 of the first projecting portion 42A. The first connecting portion P11 is maintained in a state of not coming into contact with inner wall faces of the first chamber PR1. A distal end of the third connecting portion P13 is inserted into the third chamber PR3 of the first projecting portion 42A. The third connecting portion P13 is maintained in a state of not coming into contact with inner wall faces of the third chamber PR3.

Although omitted from illustration, in the assembled state of the motor device 11, the second connecting portion P12, which is the end portion of the second power source terminal 25D2, and the fourth connecting portion P14, which is the end portion of the second ground terminal 25E2, pass through the board 41 in the axial direction of the motor body 20. A distal end of the second connecting portion P12 is inserted into the second chamber PR2 of the first projecting portion 42A. The second connecting portion P12 is maintained in a state of not coming into contact with inner wall faces of the second chamber PR2. A distal end of the fourth connecting portion P14 is inserted into the fourth chamber PR4 of the first projecting portion 42A. The fourth connecting portion P14 is maintained in a state of not coming into contact with inner wall faces of the fourth chamber PR4.

<Electrical Configuration of Motor Device>

Figure 7:
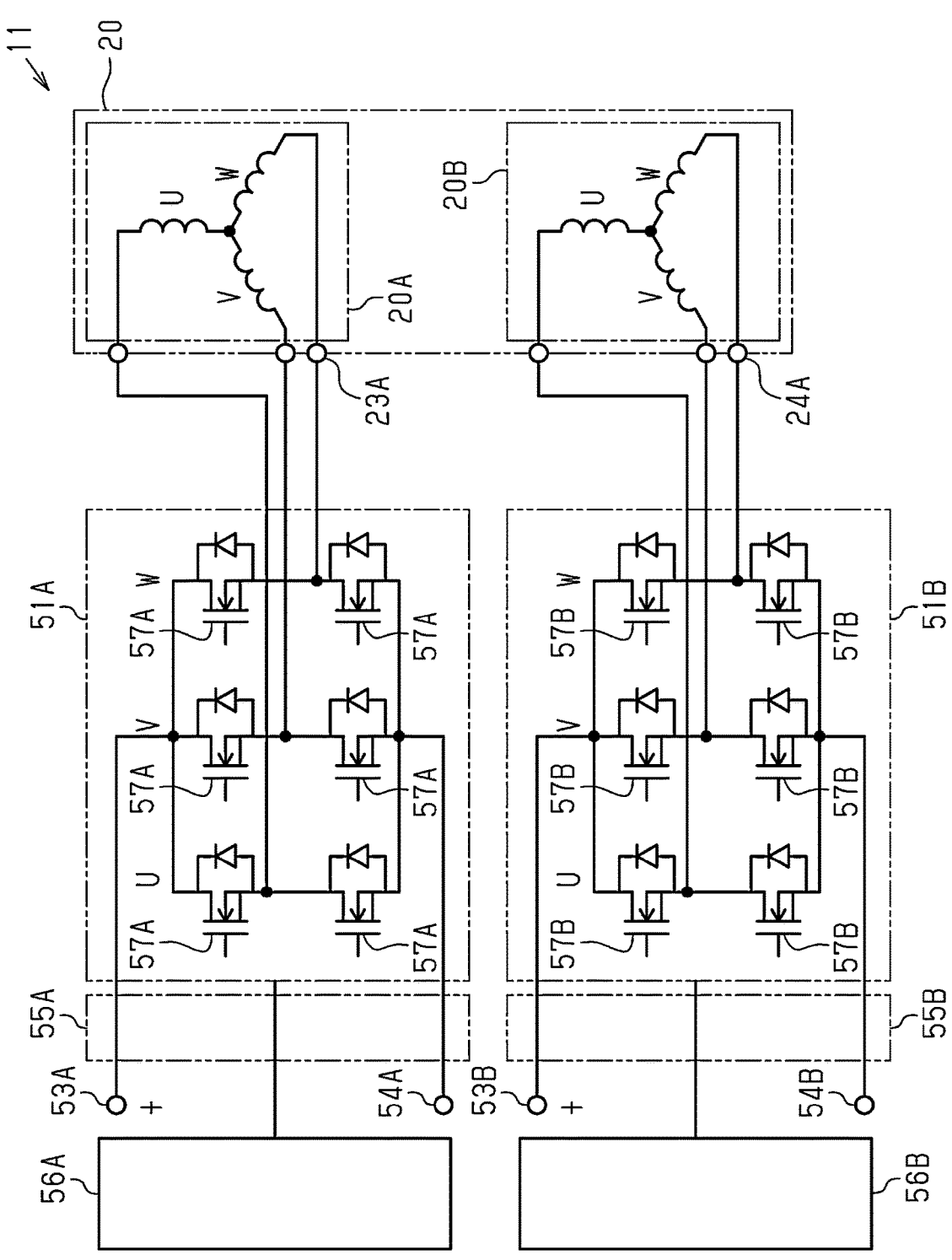
FIG. 7 is a circuit diagram of a motor control device in FIG. 2.

Next, an electrical configuration of the motor device 11 will be described. As illustrated in FIG. 7, the motor device 11 has, as the configuration of the first system, a first winding group 20A of the motor body 20, the first inverter circuit 51A, the first filter 55A, and the first microcomputer 56A.

The first winding group 20A has a U-phase winding, a V-phase winding, and a W-phase winding. The three-phase windings are connected to each other by, for example, a star connection. The windings of each phase have a first end portion that is connected to the windings of the other phases at a neutral point, and a second end portion that is connected to the first inverter circuit 51A via the first motor terminals 23A of the corresponding phase. The second end portion of the winding of each phase is connected to a midpoint of a leg of the corresponding phase of the first inverter circuit 51A.

The first inverter circuit 51A has three legs. Each leg has two FETs (Field Effect Transistor) 57A that are connected to each other in series. The three legs are connected to each other in parallel. The three legs are connected to the first power source terminal connecting portion 53A and the first ground terminal connecting portion 54A via the first filter 55A. The first power source terminal connecting portion 53A is connected to a + terminal of the direct current power source, and the first ground terminal connecting portion 54A is connected to a − terminal of the direct current power source.

The first filter 55A includes a coil provided in series with a power source line, and a capacitor connected to the power source line and a ground line. The first filter 55A removes noise superimposed on the direct current electric power supplied from the first power source terminal connecting portion 53A.

The first microcomputer 56A is a control circuit that controls actions of the first inverter circuit 51A. The first microcomputer 56A generates a switching command for each FET 57A of the first inverter circuit 51A, based on a rotation angle of the rotor that is detected through a rotation angle sensor provided on the board 41. Each FET 57A of the first inverter circuit 51A performs switching actions based on the switching command, thereby converting direct current electric power supplied from a direct current power source into three-phase alternating current electric power. The alternating current electric power generated by the first inverter circuit 51A is supplied to the first winding group 20A via the three-phase first motor terminals 23A.

The motor device 11 has, as a second system configuration, a second winding group 20B of the motor body 20, the second inverter circuit 51B, the second filter 55B, and the second microcomputer 56B.

The second winding group 20B has a U-phase winding, a V-phase winding, and a W-phase winding. The three-phase windings are connected to each other by, for example, a star connection. The windings of each phase have a first end portion that is connected to the other windings at a neutral point, and a second end portion that is connected to the second inverter circuit 51B via the second motor terminals 24A of the corresponding phase. The second end portion of the winding of each phase is connected to a midpoint of a leg of the corresponding phase of the second inverter circuit 51B.

The second inverter circuit 51B has three legs. Each leg has two FETs 57B that are connected to each other in series. The three legs are connected to each other in parallel. The three legs are connected to the second power source terminal connecting portion 53B and the second ground terminal connecting portion 54B via the second filter 55B. The second power source terminal connecting portion 53B is connected to the + terminal of the direct current power source, and the second ground terminal connecting portion 54B is connected to the − terminal of the direct current power source.

The second filter 55B includes a coil provided in series with a power source line, and a capacitor connected to the power source line and a ground line. The second filter 55B removes noise superimposed on the direct current electric power supplied from the second power source terminal connecting portion 53B.

The second microcomputer 56B is a control circuit that controls actions of the second inverter circuit 51B. The second microcomputer 56B generates a switching command for each FET 57B of the second inverter circuit 51B, based on a rotation angle of the rotor that is detected through a rotation angle sensor provided on the board 41. Each FET 57B of the second inverter circuit 51B performs switching actions based on the switching command, thereby converting direct current electric power supplied from a direct current power source into three-phase alternating current electric power. The alternating current electric power generated by the second inverter circuit 51B is supplied to the second winding group 20B via the three-phase second motor terminals 24A.

<Board Layout>

Next, the layout of the board 41 will be described.

Figure 8:
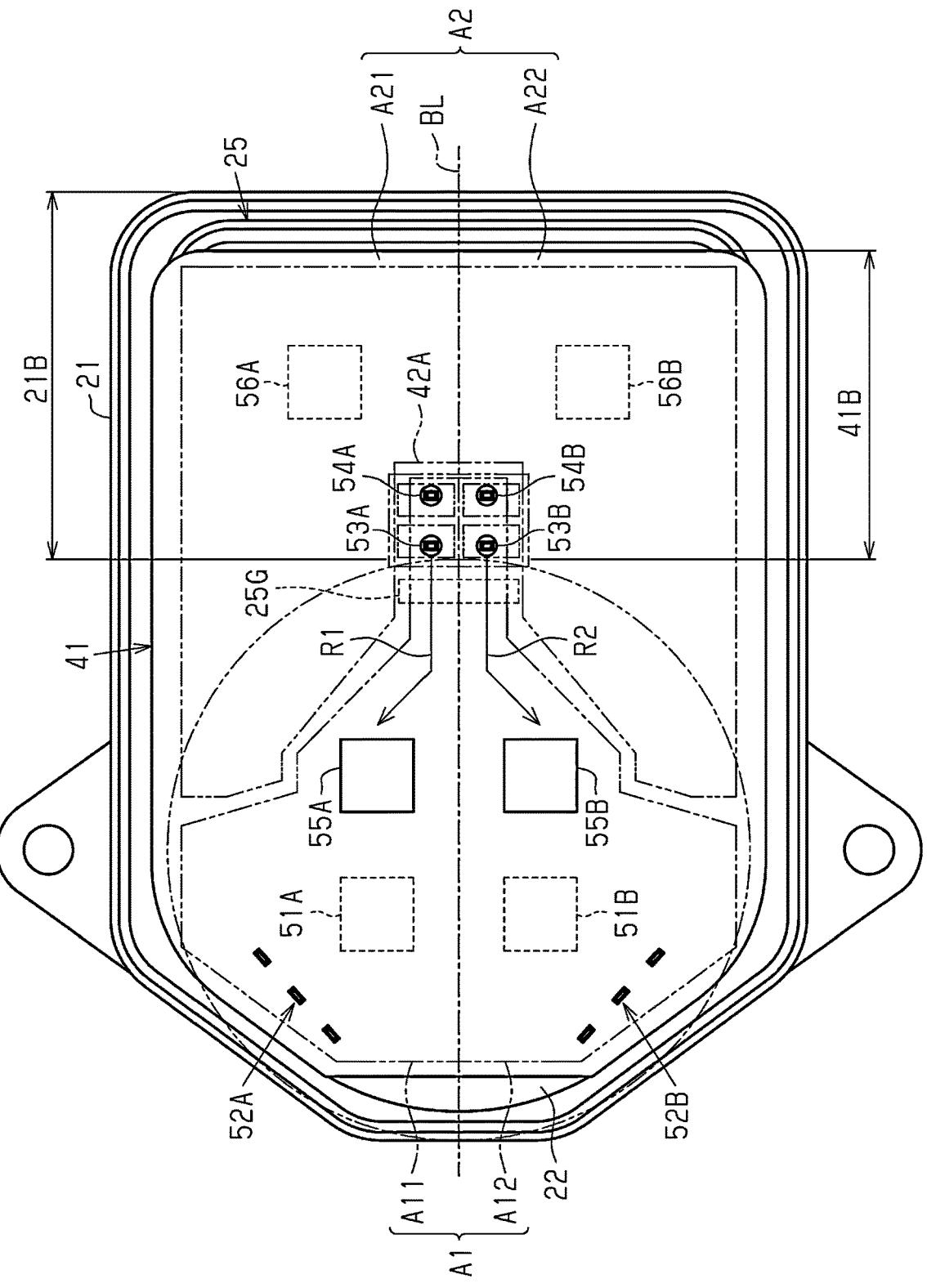
FIG. 8 is a plan view of the motor device in FIG. 2, in a state in which the cover is removed.

As illustrated in FIG. 8, the board 41 has an extending portion 41B that extends to the side of the motor body 20 as viewed from the axial direction of the motor body 20. The side is a direction orthogonal to an axial direction of the motor body 20 as viewed from the axial direction of the motor body 20. The extending portion 41B extends farther outward from the motor body 20 in a radial direction of the motor body 20. The extending portion 41B overlays the heat sink 22 and the connector assembly 25 as viewed from the axial direction of the motor body 20.

The board 41 is sectioned into a power circuit region A1 and a control circuit region A2 as viewed from the axial direction of the motor body 20. The power circuit region A1 and the control circuit region A2 are aligned along a boundary line BL as viewed from the axial direction of the motor body 20. The power circuit region A1 is a region that generally overlays the motor body 20 as viewed from the axial direction of the motor body 20. Also, the power circuit region A1 is also a region that does not overlap the connector assembly 25 as viewed from the axial direction of the motor body 20. The control circuit region A2 is a region that generally does not overlap the motor body 20 as viewed from the axial direction of the motor body 20. Also, the control circuit region A2 is also a region that overlays the connector assembly 25 as viewed from the axial direction of the motor body 20.

The power circuit region A1 has a power circuit. The power circuit is an electric circuit for causing actions of the motor body 20, and is an electric circuit for supplying electric power to the motor body 20. The power circuit has electronic components. The power circuit region A1 is further sectioned into a first power circuit region A11 and a second power circuit region A12, with the boundary line BL as a boundary.

The first power circuit region A11 has a power circuit for supplying electric power to the winding group of the first system. The power circuit includes the first inverter circuit 51A, the first motor terminal connecting portion 52A, the first power source terminal connecting portion 53A, the first ground terminal connecting portion 54A, and the first filter 55A.

The first power source terminal connecting portion 53A and the first ground terminal connecting portion 54A are provided as close to the motor body 20 as possible within an allowable range as viewed from the axial direction of the motor body 20. The first power source terminal connecting portion 53A and the first ground terminal connecting portion 54A are provided so as to be aligned along the boundary line BL as viewed from the axial direction of the motor body 20. The first power source terminal connecting portion 53A is closer to the motor body 20 than the first ground terminal connecting portion 54A as viewed from the axial direction of the motor body 20.

The second power circuit region A12 has a power circuit for supplying electric power to the winding group of the second system. The power circuit includes the second inverter circuit 51B, the second motor terminal connecting portion 52B, the second power source terminal connecting portion 53B, the second ground terminal connecting portion 54B, and the second filter 55B.

The second power source terminal connecting portion 53B and the second ground terminal connecting portion 54B are provided as close to the motor body 20 as possible within an allowable range as viewed from the axial direction of the motor body 20.

The second power source terminal connecting portion 53B and the second ground terminal connecting portion 54B are provided so as to be aligned along the boundary line BL as viewed from the axial direction of the motor body 20. The second power source terminal connecting portion 53B is closer to the motor body 20 than the second ground terminal connecting portion 54B as viewed from the axial direction of the motor body 20.

The control circuit region A2 has a control circuit. The control circuit is an electric circuit for causing actions of the motor body 20, and is an electric circuit for controlling power feed to the motor body 20. The control circuit has electronic components. The control circuit region A2 is further sectioned into a first control circuit region A21 and a second control circuit region A22, with the boundary line BL as a boundary.

The first control circuit region A21 has a control circuit for controlling power feeding to the winding group of the first system. The control circuit includes the first microcomputer 56A. The first microcomputer 56A is located further outward in the radial direction than the first power source terminal connecting portion 53A and the first ground terminal connecting portion 54A as viewed from the axial direction of the motor body 20. In other words, the first microcomputer 56A is located on the opposite side of the motor body 20 with respect to the first power source terminal connecting portion 53A and the first ground terminal connecting portion 54A as viewed from the axial direction of the motor body 20.

The second control circuit region A22 has a control circuit for controlling power feeding to the winding group of the second system. The control circuit includes the second microcomputer 56B. The second microcomputer 56B is located further outward in the radial direction than the second power source terminal connecting portion 53B and the second ground terminal connecting portion 54B as viewed from the axial direction of the motor body 20.

The components of the first system and the components of the second system are provided at positions that are line-symmetrical to each other with the boundary line BL as an axis of symmetry.

The board 41 has a first electric power route R1 and a second electric power route R2. The first electric power route R1 and the second electric power route R2 are formed by pattern wiring on the board 41. The first electric power route R1 is an electric power route for transmitting electric power supplied from the first power source terminal connecting portion 53A to the electronic components in the first power circuit region A11. The first electric power route R1 has a portion extending along the boundary line BL, starting from the first power source terminal connecting portion 53A as viewed from the axial direction of the motor body 20. The second electric power route R2 is an electric power route for transmitting electric power supplied from the second power source terminal connecting portion 53B to the electronic components in the second power circuit region A12. The second electric power route R2 has a portion extending along the boundary line BL, starting from the second power source terminal connecting portion 53B as viewed from the axial direction of the motor body 20.

Note that the first projecting portion 42A of the cover 42 and the second projecting portion 25G of the connector assembly 25 are located on the boundary line BL as viewed from the axial direction of the motor body 20. Also, the first projecting portion 42A and the second projecting portion 25G are aligned along the boundary line BL as viewed from the axial direction of the motor body 20. The first projecting portion 42A is located so as to intersect with the first electric power route R1 and the second electric power route R2 as viewed from the axial direction of the motor body 20. The second projecting portion 25G is closer to the motor body 20 than the first projecting portion 42A as viewed from the axial direction of the motor body 20. In other words, the second projecting portion 25G is located between the first projecting portion 42A and the motor body 20 as viewed from the axial direction of the motor body 20. The second projecting portion 25G is located so as to intersect the first electric power route R1 and the second electric power route R2 as viewed from the axial direction of the motor body 20.

Effects and Advantages of Embodiment

The present embodiment achieves the following effects and advantages.

(1) The motor device 11 is installed in, for example, a vehicle. In this case, there is concern that a portion of the vehicle may interfere with the motor device 11 due to the vehicle colliding with some object. When the motor device 11 is installed in an engine compartment of the vehicle, there is concern that an engine or a transmission may interfere with the motor device 11. When the motor device 11 is provided on a steering column, there is concern that components provided inside of a dashboard may interfere with the motor device 11.

Figure 9:
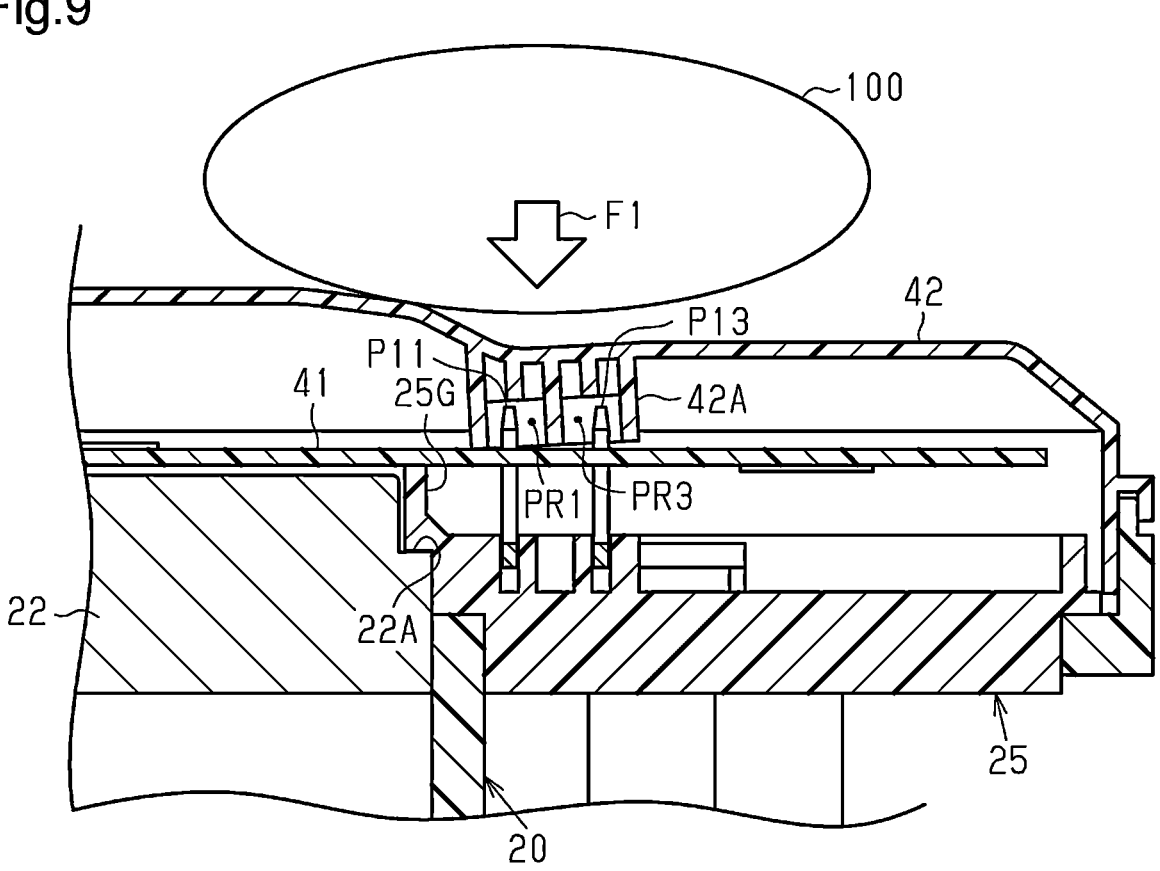
FIG. 9 is a cross-sectional view illustrating the principal portions of the motor device in FIG. 2.

As illustrated in FIG. 9, when a component 100 of the vehicle comes into contact with an outer face of the cover 42 in the axial direction of the motor body 20, an external force F1 is applied to the cover 42. The external force F1 is, for example, a force in a direction intersecting the end wall of the cover 42. There is concern that, due to the external force F1 being applied to the outer face of the cover 42, the end wall of the cover 42 will be deformed and thereby crushed. The end wall of the cover 42 will be elastically deformed and thereby come close to the board 41, depending on the magnitude of the external force F1. As the end wall of the cover 42 deforms, at least a portion of the distal end portion of the first projecting portion 42A comes into contact with the front face of the board 41.

At least a portion of the distal end portion of the first projecting portion 42A comes into contact with a region of the board 41 adjacent to the terminal connecting portions (53A, 54A, 53B, 54B) before the terminals (25D1, 25D2, 25E1, 25E2) come into contact with the end wall of the cover 42. This is because the height of projection of the first projecting portion 42A, with the inner face of the end wall of the cover 42 as a reference, is higher than the projecting length of the terminals (25D1, 25D2, 25E1, 25E2) with the front face of the board 41 as a reference. In the example in FIG. 9, the first projecting portion 42A is slightly inclined in a counterclockwise direction with respect to the front face of the board 41, and a distal end portion of the first long side wall 42A1 is in contact with the front face of the board 41. Of course, the entire distal end face of the first projecting portion 42A may come into contact with the front face of the board 41.

In this way, at least a portion of the distal end portion of the first projecting portion 42A comes into contact with the front face of the board 41, thereby restricting the end wall of the cover 42 from elastically deforming in a direction toward the front face of the board 41. Accordingly, the distal end portion of the first connecting portion P11, which is the upright end portion of the first power source terminal 25D1, and the distal end portion of the third connecting portion P13, which is the upright end portion of the first ground terminal 25E1, are suppressed from piercing the end wall of the cover 42. This suppresses the first power source terminal 25D1 from coming into contact with the component 100 of the vehicle. This also suppresses short circuiting from occurring between the first power source terminal 25D1 and the component 100 of the vehicle.

Although omitted from illustration, at least a portion of the distal end portion of the first projecting portion 42A comes into contact with the front face of the board 41, whereby the distal end portion of the second connecting portion P12, which is the upright end portion of the second power source terminal 25D2, and the distal end portion of the fourth connecting portion P14, which is the upright end portion of the second ground terminal 25E2, are also suppressed from piercing the end wall of the cover 42. This suppresses the second power source terminal 25D2 from coming into contact with the component 100 of the vehicle.

This also suppresses short circuiting from occurring between the second power source terminal 25D2 and the component 100 of the vehicle.

(2) When at least a portion of the distal end portion of the first projecting portion 42A is further pressed against the front face of the board 41, the board 41 is subjected to a deflection force in a direction away from the end wall of the cover 42 at the portion where the first projecting portion 42A is in contact. The board 41 is supported by the second projecting portion 25G of the connector assembly 25 at a position between a portion where the first projecting portion 42A comes into contact therewith and a portion facing the end face of the heat sink 22. Accordingly, even when the board 41 is subjected to deflection force in the direction away from the end wall of the cover 42, the rear face of the board 41 and the end face of the heat sink 22 are maintained in a state of being isolated from each other. Thus, short circuiting between the pattern wiring of the board 41 and the heat sink 22 is suppressed from occurring.

Figure 10:
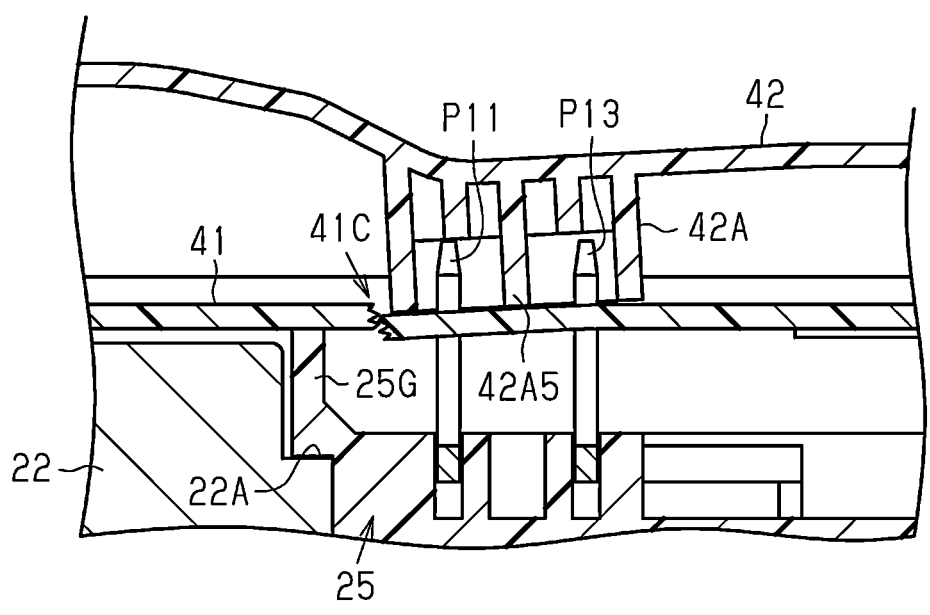
FIG. 10 is a cross-sectional view illustrating the principal portions of the motor device in FIG. 2.

(3) As illustrated in FIG. 10, when at least a portion of the distal end portion of the first projecting portion 42A is further pressed against the front face of the board 41, at least a portion of the distal end portion of the first projecting portion 42A is further presses against the board 41 in the direction away from the end wall of the cover 42. Thus, shearing force acts on the board 41. The shearing force is two forces that are parallel with respect to a cross-section of the board 41 along the thickness direction thereof, in opposite directions to each other. The shearing force includes a first force in which at least a portion of the distal end portion of the first projecting portion 42A presses the board 41 in a direction away from the end wall of the cover 42, and a second force that the board 41 is subjected to as reaction force from the second projecting portion 25G supporting the board 41. The second force is a force in the opposite direction to the first force.

Thus, shear stress occurs in a region between the portion of the board 41 that the distal end portion of the first projecting portion 42A comes into contact with and the portion of the board 41 that the distal end portion of the second projecting portion 25G of the connector assembly 25 comes into contact with. The shear stress is two internal forces that are parallel to a cross-section of the board 41 along the thickness direction thereof, in opposite directions to each other. When the shear stress exceeds shear strength of the board 41, the region between the portion of the board 41 that the distal end portion of the first projecting portion 42A comes into contact with and the portion of the board 41 that the distal end portion of the second projecting portion 25G of the connector assembly 25 comes into contact with is partially sheared.

Figure 11:
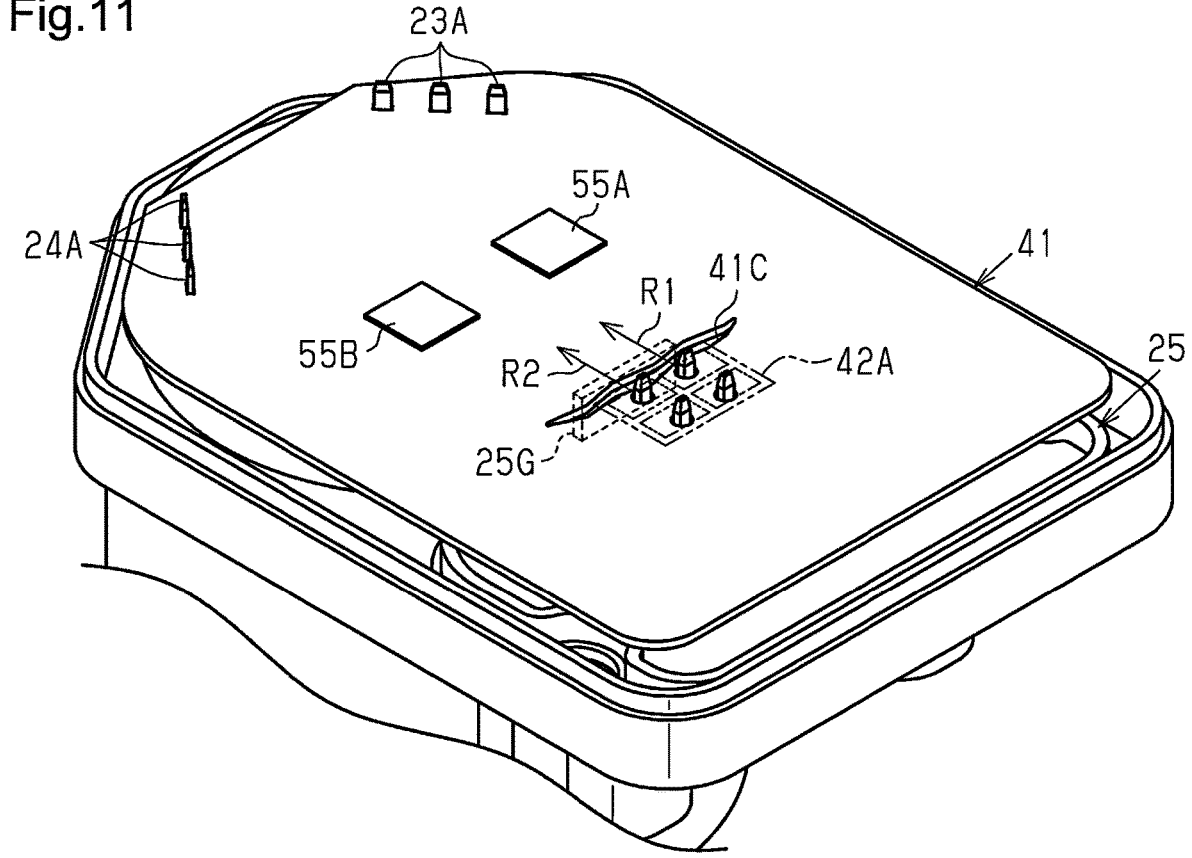
FIG. 11 is a perspective view of the motor device in FIG. 2, in a state in which the cover is removed.

As illustrated in FIG. 11, a sheared portion 41C of the board 41 extends linearly in the short side direction of the board 41. The sheared portion 41C extends across the first electric power route R1 and the second electric power route R2. Due to formation of the sheared portion 41C in the board 41, the first electric power route R1 and the second electric power route R2 are severed. Accordingly, the power feed from the first power source terminal connecting portion 53A to the first power circuit region A11, and the power feed from the second power source terminal connecting portion 53B to the second power circuit region A12, are interrupted. Accordingly, even when the electronic components on the board 41, especially the electronic components in the power circuit region A1, are damaged due to interference with the cover 42, short-circuiting due to the damaged electronic components is suppressed from occurring.

(4) There is concern that impact when the board 41 is sheared may cause a soldered connection state between the first connecting portion P11, which is the upright end portion of the first power source terminal 25D1, and the first power source terminal connecting portion 53A, to come loose. Also, there is concern that a soldered connection state between the third connecting portion P13, which is the upright end portion of the first ground terminal 25E1, and the first ground terminal connecting portion 54A, may come loose. There is concern that this may cause the first connecting portion P11 and the third connecting portion P13 to be displaced so as to further protrude from the front face of the board 41. There is concern that the second connecting portion P12, which is the upright end portion of the second power source terminal 25D2, and the fourth connecting portion P14, which is the upright end portion of the second ground terminal 25E2, may also become displaced in the same way as the first connecting portion P11 and the third connecting portion P13. At this time, it is conceivable that the first to fourth connecting portions P11 to P14 will be deformed or displaced in an unexpected direction.

With respect to this point, the first to fourth connecting portions P11 to P14 are shielded from each other by the first partition wall 42A5 or the second partition wall 42A6. For example, the first partition wall 42A5 is interposed between the first connecting portion P11 and the third connecting portion P13. Accordingly, the first connecting portion P11 and the third connecting portion P13 do not come into contact with each other. Thus, short-circuiting between the first power source terminal 25D1 and the first ground terminal 25E1 is suppressed from occurring. Also, the first partition wall 42A5 is interposed between the second connecting portion P12 and the fourth connecting portion P14 as well. Accordingly, the second connecting portion P12 and the fourth connecting portion P14 do not come into contact with each other. Thus, short-circuiting between the second power source terminal 25D2 and the second ground terminal 25E2 is suppressed from occurring.

<Other Embodiments>

The present embodiment may be carried out modified as follows.

The cover 42 may have a greater thickness in a region corresponding to the first projecting portion 42A than at other portions. Thus, when the first to fourth connecting portions P11 to P14 are displaced so as to further protrude from the front face of the board 41, the first to fourth connecting portions P11 to P14 will pierce the end wall of the cover 42 less readily.

The cover 42 may be made of metal. Depending on the thickness of the cover 42, the end wall of the cover 42 will be deformed in a direction closer to the board 41, due to the external force F1. At least the region of the cover 42 where there is a possibility that the first to fourth connecting portions P11 to P14 will come into contact with the cover, i.e., the first projecting portion 42A and the region inside thereof, can be imparted insulating properties.

The distal end of the second projecting portion 25G does not have to be in contact with the rear face of the board 41 when the external force F1 is not being applied to the end wall of the cover 42. It is sufficient for the second projecting portion 25G project to a position closer to the board 41 than the end face of the heat sink 22 in the axial direction of the motor body 20. When the end wall of the cover 42 is deflected in the direction closer toward the board 41, at least a portion of the board 41 is supported by the second projecting portion 25G in a state of being isolated from the end face of the heat sink 22.

The motor 12 may have a winding group of just one system. In this case, the board 41 may have a configuration for supplying electric power to the winding group of just one system. It is sufficient for the first projecting portion 41A to have two chambers that house the power source terminal and the ground terminal for one system.

The positions of the first connecting portion P11, which is the upright end portion of the first power source terminal 25D1, and the third connecting portion P13, which is the upright end portion of the first ground terminal 25E1, may be reversed. In this case, the second partition wall 42A6 is interposed between the third connecting portion P13 and the second connecting portion P12, and between the first connecting portion P11 and the fourth connecting portion P14. Accordingly, the third connecting portion P13 and the second connecting portion P12 do not come into contact with each other. The first connecting portion P11 and the fourth connecting portion P14 do not come into contact with each other, either. Also, the positions of the second connecting portion P12, which is the upright end portion of the second power source terminal 25D2, and the fourth connecting portion P14, which is the upright end portion of the second ground terminal 25E2, may be reversed.

It is sufficient that, when the end wall of the cover 42 deflects in a direction closer to the board 41, the first projecting portion 42A has a peripheral wall that comes into contact with the front face of the board 41 so as to surround the entire periphery of the first to fourth connecting portions P11 to P14. For example, a configuration in which the first partition wall 42A5 and the second partition wall 42A6 are omitted may be employed as the first projecting portion 42A. In this case, the first projecting portion 42A has a peripheral wall including four side walls (42A1, 42A2, 42A3, 42A4).

It is sufficient that, when the end wall of the cover 42 deflects in a direction closer to the board 41, the first projecting portion 42A has a wall that comes into contact with the front face of the board 41 so as to shield part of the periphery of the first to fourth connecting portions P11 to P14. For example, a configuration in which the first projecting portion 42A has at least the first long side wall 42A1 from out of the first long side wall 42A1 and the second long side wall 42A2, may be employed. Also, a configuration in which the first projecting portion 42A has at least one of the first short side wall 42A3 and the second short side wall 42A4, may be employed. Also, a configuration in which at least one of the first short side wall 42A3 and the second short side wall 42A4 is omitted, may be employed as the first projecting portion 42A. At least a portion of the distal end portion of the first projecting portion 42A comes into contact with a region of the board 41 adjacent to the terminal connecting portions (53A, 54A, 53B, 54B) before the terminals (25D1, 25D2, 25E1, 25E2) come into contact with the end wall of the cover 42, in such arrangements as well.

The motor device 11 may be used, for example, as a drive source for an electric power steering system. In this case, the motor 12 functions as an assist motor that generates a steering assist force. The motor control device 13 controls the motor 12 serving as the assist motor.

The motor device 11 may be used as a drive source for a reaction mechanism or a steering operation mechanism in a steer-by-wire steering device. In this case, the motor 12 functions as a reaction motor that generates a steering reaction force, or as a steering motor that generates a steering force for steering steered wheels of a vehicle. The motor control device 13 controls the motor 12 serving as the reaction motor or the steering motor.

The motor device 11 is not limited to vehicle applications. This is suitable for a drive source of an electric power device regarding which there is concern that an external force may be applied to the cover 42 for some reason.

The invention claimed is:

1. A motor device comprising:

a motor; and a motor control device provided at an end portion of the motor, wherein the motor control device has a board attached to the end portion of the motor to control the motor, and a cover that has flexibility and that is attached to the end portion of the motor so as to cover the board, the motor has a motor body and a connector assembly that is disposed on a side of the motor body as viewed from an axial direction of the motor body, the board has an extending portion that extends to the side of the motor body so as to overlay the connector assembly, as viewed in the axial direction of the motor body, the extending portion has a terminal connecting portion located between an end wall of the cover and the connector assembly, and a terminal held by the connector assembly is connected to the terminal connecting portion in a state of passing through the extending portion from the connector assembly toward the cover, the cover has a first projecting portion having insulating properties that projects from an inner face of the end wall thereof toward the board, and the first projecting portion is configured such that, when the end wall of the cover is subjected to an external force and is deflected in a direction closer to the board, the first projecting portion comes into contact with a region of the board adjacent to the terminal connecting portion before the terminal comes into contact with the end wall of the cover.

2. The motor device according to claim 1, wherein the first projecting portion has a peripheral wall that is configured to come into contact with the board and surround an entire periphery of the terminal, or a wall that is configured to come into contact with the board so as to shield a part of a periphery of the terminal, when the end wall of the cover is deflected.

3. The motor device according to claim 1, wherein the end portion of the motor body has a heat sink that has electroconductivity, the connector assembly has a second projecting portion that has insulating properties and that projects to a position closer to the board than an end face of the heat sink, in the axial direction of the motor body, and the second projecting portion is configured to support at least a portion of the board in a state isolated from the end face of the heat sink, when the end wall of the cover is deflected.

4. The motor device according to claim 3, wherein the board has a power circuit region configured to convert electric power supplied to the terminal from an outside power source into electric power to be supplied to the motor body, an electric power route through which the electric power supplied from the power source is transmitted to the power circuit region, the first projecting portion and the second projecting portion are disposed so as not to overlap each other as viewed from the axial direction of the motor body, and are disposed adjacent to each other in a direction in which the electric power route extends, and at least one of the first projecting portion and the second projecting portion has a portion that intersects the electric power route.

5. The motor device according to claim 1, wherein the terminal includes a power source terminal and a ground terminal, and the first projecting portion has a partition wall that is interposed between the power source terminal and the ground terminal when the end wall of the cover is deflected.

* * * * *